(12) United States Patent
Jiang (10) Patent No.: US 11,131,880 B2
(45) Date of Patent: Sep. 28, 2021

(54) LIGHTING DEVICE AND LIGHT HOUSING

(71) Applicants:OPPLE LIGHTING CO., LTD., Shanghai (CN); SUZHOU OPPLE LIGHTING CO., LTD., Suzhou (CN)

(72) Inventor: Haitao Jiang, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 16/843,701

(22) Filed: Apr. 8, 2020

(65) Prior Publication Data

US 2020/0233266 A1 Jul. 23, 2020

Related U.S. Application Data

(63) Continuation of application No. PCT/CN2018/109514, filed on Oct. 9, 2018.

(30) Foreign Application Priority Data

Oct. 10, 2017 (CN) .......................... 201710933705.2
Oct. 10, 2017 (CN) .......................... 201721297537.4

(51) Int. Cl.
*G02F 1/13357* (2006.01)
*F21V 15/01* (2006.01)
*F21V 8/00* (2006.01)

(52) U.S. Cl.
CPC ........ *G02F 1/133605* (2013.01); *F21V 15/01* (2013.01); *G02B 6/0016* (2013.01); *G02F 1/133606* (2013.01); *G02F 1/133608* (2013.01)

(58) Field of Classification Search
CPC . F21V 14/003; G09F 2013/1809; G09F 13/02
See application file for complete search history.

(56) References Cited

U.S. PATENT DOCUMENTS

| | | | | |
|---|---|---|---|---|
| 8,151,500 B2* | 4/2012 | Lin | ........................... | G09F 1/12 40/546 |
| 8,837,032 B2* | 9/2014 | Lam | ....................... | G02B 5/223 359/241 |

(Continued)

FOREIGN PATENT DOCUMENTS

| CN | 102355783 A | 2/2012 |
|---|---|---|
| CN | 203642112 U | 6/2014 |

(Continued)

OTHER PUBLICATIONS

International Search Report to PCT Application No. PCT/CN2018/109514, dated Dec. 18, 2018 with English translation, (4p).

*Primary Examiner* — Jong-Suk (James) Lee
*Assistant Examiner* — Eric T Eide
(74) *Attorney, Agent, or Firm* — Arch & Lake LLP (57) ABSTRACT

A lighting device and a light housing are provided. The lighting device includes a housing, and the housing is provided with a light exit and an accommodating cavity extending inward from the light exit; the lighting device further includes a first light source, a second light source, and a controller. The controller controls at most one selected from a group consisting of the first light source and the second light source to emit light. Both the first light source and the second light source are disposed in the accommodating cavity. The first light source is used for an auxiliary lighting mode, in the case where the first light source emits light, the background image is visible from the light exit; and the second light source is used for a main lighting mode.

18 Claims, 3 Drawing Sheets

(56) References Cited

U.S. PATENT DOCUMENTS

| | | | | |
|---|---|---|---|---|
| 2006/0109682 A1* | 5/2006 | Ko | ................ | G02B 6/0051 |
| | | | | 362/607 |
| 2006/0239025 A1* | 10/2006 | Azorin | ................ | G02B 6/0055 |
| | | | | 362/559 |
| 2011/0255303 A1* | 10/2011 | Nichol | ................ | G02B 6/0028 |
| | | | | 362/606 |
| 2013/0114292 A1 | 5/2013 | Brick et al. | | |
| 2016/0363831 A1* | 12/2016 | Ash | ................ | G02F 1/13318 |

FOREIGN PATENT DOCUMENTS

| | | |
|---|---|---|
| CN | 104165307 A | 11/2014 |
| CN | 107631213 A | 1/2018 |

\* cited by examiner

LIGHTING DEVICE AND LIGHT HOUSING

CROSS-REFERENCE TO RELATED APPLICATIONS

This application is based upon and claims priority to PCT patent application No. PCT/CN2018/109514 filed on Oct. 9, 2018 which claims the priority of Chinese Patent Application No. 201710933705.2, filed on Oct. 10, 2017, and Chinese Patent Application No. 201721297537.4, filed on Oct. 10, 2017, the entire contents of which are incorporated herein by reference.

TECHNICAL FIELD

The present disclosure relates to a field of lighting technology, and in particular, relates to a lighting device.

BACKGROUND

A lighting device is used for emitting light, and the lighting device is an indispensable device in daily life. In different environments, users need to turn on different lighting devices, such as main lighting devices, local lighting devices, auxiliary lighting devices, and so on, so as to meet the requirements of work and life of the users.

At present, the lighting device often has only one fixed lighting mode, that is, only one selected from a group consisting of the main lighting, the local lighting, and the auxiliary lighting can be achieved, in order to be able to use different lighting modes in the same space, users often need to set a plurality of lighting devices with different lighting modes.

However, equipping with a plurality of lighting devices not only takes up more space, but also brings inconvenience to installation and wiring.

SUMMARY

In order to solve the problems in the prior art, the present disclosure provides a lighting device capable of adjusting a lighting mode, to meet the various requirements of users and to simplify the installation and arrangement of the lighting device.

A first aspect of the present disclosure provides a lighting device, the lighting device includes a housing, and the housing is provided with a light exit and an accommodating cavity extending inward from the light exit; the lighting device further includes a first light source, a second light source, and a controller; the controller is connected with both the first light source and the second light source, and the controller is used to control at most one selected from a group consisting of the first light source and the second light source to emit light; both the first light source and the second light source are disposed in the accommodating cavity of the housing, the first light source is away from the light exit, and the second light source is close to the light exit; and the first light source includes a first light-emitting unit and a background image that receives light from the first light-emitting unit and reflects the light to the light exit.

A second aspect of the present disclosure provides a light housing. The light housing includes a light exit and an accommodating cavity extending inward from the light exit. The light housing also includes a first light source and a second light source disposed in the accommodating cavity of, where the first light source is away from the light exit, and the second light source is close to the light exit. The first light source includes a first light-emitting unit and a background image that receives light from the first light-emitting unit and reflects the light to the light exit.

BRIEF DESCRIPTION OF THE DRAWINGS

The drawings described herein are used to provide a further understanding of the present disclosure, and the drawings constitute a part of the present disclosure. The schematic embodiments of the present disclosure and the descriptions thereof are used for explaining the present disclosure, and thus do not constitute an improper limitation on the present disclosure. In the drawings.

DETAILED DESCRIPTION

In order to make objects, technical details, and advantages of embodiments of the present disclosure clearer, the technical solutions of the present disclosure will be described in a clearly and fully understandable way in connection with the specific embodiments of the present disclosure and the related drawings. It is apparent that the described embodiments are just a part but not all of the embodiments of the present disclosure. Based on the described embodiments of the present disclosure, those skilled in the art can obtain other embodiment(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
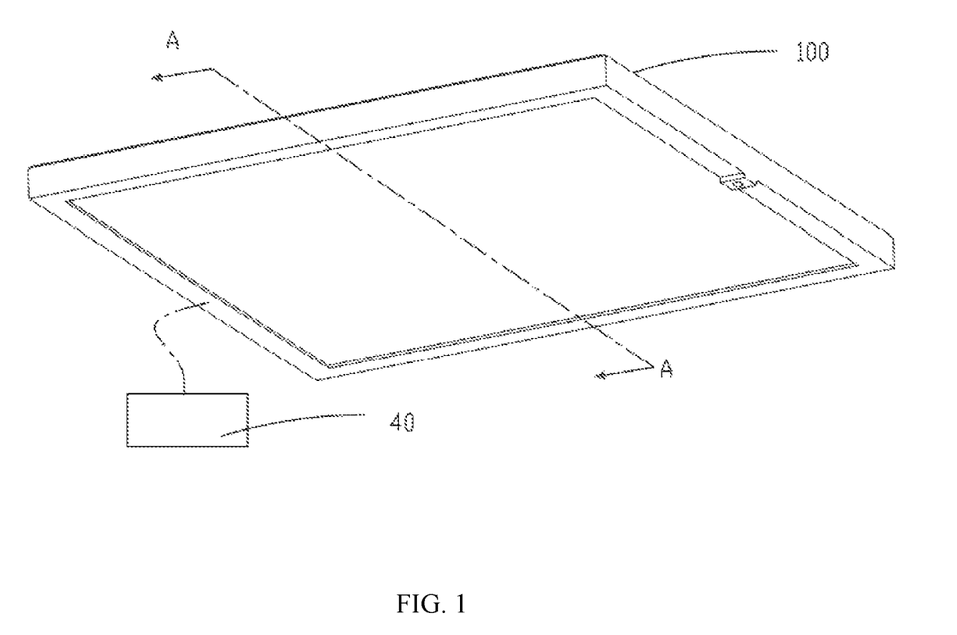
FIG. 1 is a schematic stereoscopic diagram of a lighting device provided by an exemplary embodiment of the present disclosure.
Figure 2:
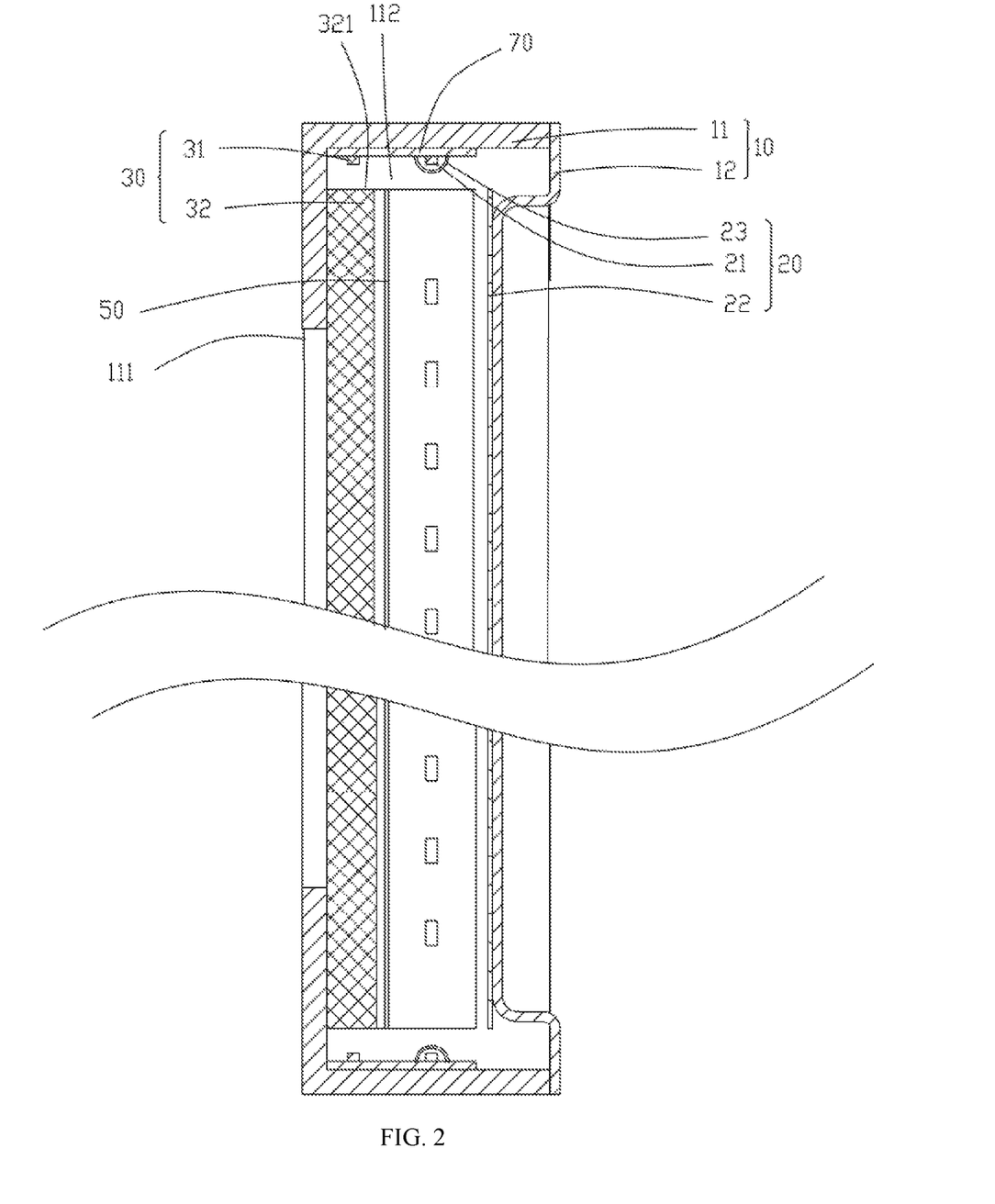
FIG. 2 is a cross-sectional view diagram of the lighting device in FIG. 1 taking along a line of A-A after the controller is removed.
Figure 3:
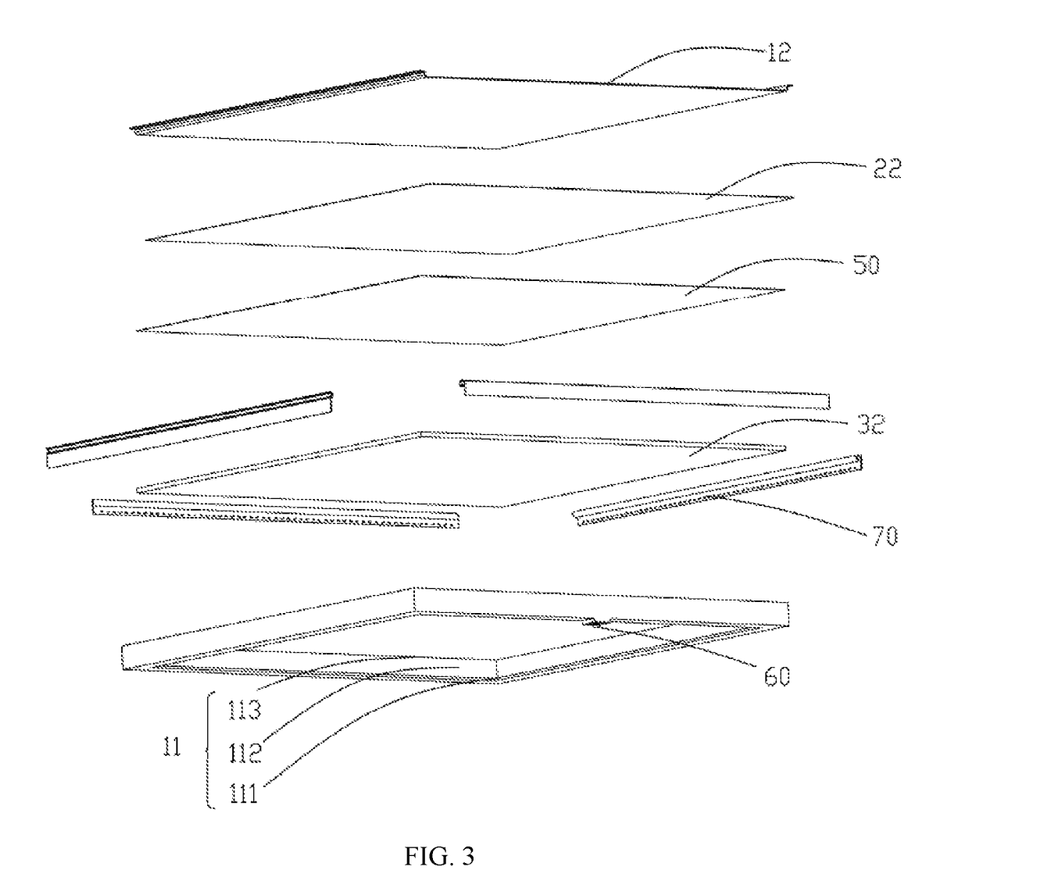
FIG. 3 is an exploded diagram of the lighting device in FIG. 1 after the controller is removed.

As shown in FIG. 1, FIG. 2, and FIG. 3, a lighting device 100 provided by the embodiment includes a housing 10, the housing 10 is provided with a front housing 11 and a rear cover 12, and the front housing 11 is provided with a light exit 111 and an accommodating cavity 112 extending inward from the light exit 111. The lighting device 100 further includes a first light source 20, a second light source 30, and a controller 40. Both the first light source 20 and the second light source 30 are disposed in the accommodating cavity 112 of the housing 10, and the first light source 20 and the second light source 30 are sequentially arranged in a direction close to the light exit 111, that is, the first light source 20 is relatively away from the light exit 111 in the accommodating cavity 112, and the second light source 30 is relatively close to the light exit 111 in the accommodating cavity 112. The controller 40 is connected with both the first light source 20 and the second light source 30, and the controller 40 is used to control at most one selected from a group consisting of the first light source 20 and the second light source 30 to emit light. The first light source 20 and the second light source 30 implements the auxiliary lighting mode and the main lighting mode, respectively, so as to meet the diverse requirements of users. The first light source 20 includes a first light-emitting unit 21 and a background image 22 that is visible from the light exit 111, the background image 22 is illuminated in the case where the first light-emitting unit 21 emits light, and the light on the background image 22 is emitted from the light exit 111 after being reflected, so that the user can see the background image 22 illuminated by the first light-emitting unit 21, and the auxiliary lighting mode with a decorative effect is achieved.

In the embodiments of the present disclosure, the main lighting mode refers to that the light device has a high luminous flux in the case where the light device emits light, for example, a common ceiling light lighting mode. The auxiliary lighting mode refers to that the light device has a lower luminous flux in the case where the light device emits light, for example, a small nightlight lighting mode. The auxiliary lighting mode includes an auxiliary constant light-on mode in which the light-emitting unit is always on and an auxiliary on-off mode in which the light-emitting unit is switched between on and off.

The first light-emitting unit 21 in the first light source 20 has a lower output power for implementing auxiliary lighting, and the second light-emitting unit 31 in the second light source 30 has a higher output power for implementing main lighting. Of course, in practical applications, the output power of the first light-emitting unit 21 may be similar to the output power of the second light-emitting unit 31, or the output power of the first light-emitting unit 21 is higher than the output power of the second light-emitting unit 31. For example, both the first light-emitting unit 21 and the second light-emitting unit 31 are light-emitting diodes.

In the embodiment of the present disclosure, the second light source 30 includes a light guide plate 32 stacked with the background image 22 and a second light-emitting unit 31 disposed on a side surface of the light guide plate 32, and the light guide plate 32 may be flush-stacked with the background image 22 in the accommodating cavity 112, in this case, a projection, which is towards the light exit 111, of the first light source 20 overlaps with a projection, which is towards the light exit 111, of the second light source 30. The second light-emitting unit 31 is arranged around the peripheral side of the light guide plate 32, specifically, a plurality of second light-emitting units 31 are mounted on each of the light source substrates, at least one side surface 321 of the light guide plate 32 is provided with a light source substrate. The light guide plate 32 completely covers the light exit 111 in the accommodating cavity 112, in the case where the second light-emitting unit 31 emits light, the light emitted from the second light-emitting unit 31 is emitted from the light exit 111 after being diffused by the light guide plate 32; and in the case where the first light-emitting unit 21 emits light, the light emitted from the first light-emitting unit 21 passes through the light guide plate 32 after being reflected by the background image 22 and then is emitted from the light exit 111. Whether the first light-emitting unit 21 emits light or the second light-emitting unit 31 emits light, the light exit 111 is always filled with light, so that a light-emitting surface of the lighting device is maximized.

As a variation, the projection, which is towards the light exit 111, of the first light source 20 is not overlapped with the projection, which is towards the light exit 111, of the second light source 30, that is, the emitted light of the first light source 20 and the emitted light of the second light source 30 are emitted according to their own paths, respectively. For example, the projection, which is towards the light exit 111, of the first light source 20 is located at the center, the projection, which is towards the light exit 111, of the second light source 30 is located at the periphery, thus the first light source 20 is arranged in a sheet shape in the accommodating cavity; the second light source 30 is arranged in a ring shape in the accommodating cavity, and the size of the second light source 30 in the ring shape is larger than the size of the first light source 20 in the sheet shape; on the contrary, the projection, which is towards the light exit, of the second light source 30 is located at the center, the projection, which is towards the light exit, of the first light source 20 is located at the periphery, thus the second light source 30 is arranged in a sheet shape in the accommodating cavity, the first light source 20 is arranged in a ring shape in the accommodating cavity, and the size of the first light source 20 in the ring shape is larger than the size of the second light source 30 in the sheet shape; or the projection, which is towards the light exit, of the first light source 20 and the projection, which is towards the light exit, of the second light source 30 are arranged in parallel, that is, the first light source 20 is located on a side of the accommodating cavity, and the second light source 30 is located on another side of the accommodating cavity. Of course, in this variation, in the case where any one of the first light source 20 and the second light source 30 emits light, the light exit is not filled with light, and there is some dark regions at the light exit.

In the embodiments of the present disclosure, in order to make full use of the emitted light of the second light-emitting unit 31 to make the main lighting of the second light source 30 has a higher light efficiency, an optical axis of the second light-emitting unit 31 is collinear with a center line of the light guide plate 32. A plurality of second light-emitting units 31 are arranged in a row on the side surface 321 of the light guide plate 32. The optical axis refers to a central axis of a light-emitting surface on the second light-emitting unit 31, and the center line of the light guide plate 32 refers to the center line of the side surface 321. In other words, the light-emitting surface of the second light-emitting unit 31 faces the side surface 321 of the light guide plate 32, and the central axis of the light-emitting surface is collinear with the central line on the side surface 321 of the light guide plate, so that all the light emitted from the second light-emitting unit 31 can enter the light guide plate 32 and be emitted through the light guide plate 32.

In order to achieve guiding light, laser dots are formed on a back of a common light guide plate 32 or printing dots are formed on the surface of the common light guide plate 32, the light entering from the side surface 321 of the light guide plate 21 is deflected at the laser dots or the printing dots in the case where the light propagates in the light guide plate, so that the light entering from the side surface 321 of the light guide plate 32 finally exits from the front surface of the light guide plate 32. If the common light guide plate 32 has no laser dots or printing dots, most of the light may only propagate within the light guide plate 32 in a total reflection, that is, the light enters from one side surface of the light guide plate 32, and exits from another side surface of the light guide plate 32. It should be noted that, a shape of the light guide plate 32 is a cuboid, the front surface and the back surface of the light guide plate 32 refer to two rectangular planes opposite to each other, and the side surfaces 321 refer to four side surfaces adjacent to the front surface.

In the embodiments of the present disclosure, if the common light guide plate provided with the laser spots or the printing spots is used, in the case where the light emitted from the first light source 20 passes through the light guide plate 32, the permeability of the light guide plate 32 is reduced due to the arrangement of the laser dots or the printing dots, so that the background image 22 cannot be clearly displayed. For this reason, in the embodiments of the present disclosure, the surfaces of the light guide plate 32 are not provided with the printing dots or the laser dots, instead, transparent diffusion particles are added to the light guide plate in the case of manufacturing the light guide plate. The transparent diffusion particles can diffuse the light entering from the side surface 321 of the light guide plate and then make the light exit from the front surface, so that the light guide plate 32 can maintain good permeability, the light emitted by the first light source 20 can be transmitted through the light guide plate 32 with a high transmittance, and the background image 22 is clearly displayed. Specifically, for example, the transparent diffusion particles are silicone diffusion agents.

The lighting device 100 further includes an electrochromic film 50 disposed between the light guide plate 32 and the background image 22, and the electrochromic film 50 is flush-stacked between the light guide plate 32 and the background image 22. As a variation, the electrochromic film 50 may also be disposed between the light guide plate 32 and the first light source 20.

The electrochromic film 50 is a film manufactured using the principle of electrochromism, and the electrochromic film 50 may be an existing tungsten oxide electrochromic film. Electrochromism is the phenomenon that color of a material changes reversibly under action of an external electric field. In the case where the electrochromic film 50 is powered on, the electrochromic film 50 is in a transmission state; and in the case where the electrochromic film 50 is powered off, the electrochromic film 50 is in a non-transmission state.

In the case where the first light-emitting unit 21 emits light, the controller 40 controls the electrochromic film 50 to be powered on, so that the electrochromic film 50 is in the transmission state, and the light on the background image 22 passes through both the electrochromic film 50 and the light guide plate 32 and exits from the light exit 111, thereby achieving the auxiliary lighting mode. In the case where the first light-emitting unit 21 is powered off, the controller 40 controls the electrochromic film 50 to be powered off, so that the electrochromic film 50 is in the non-transmission state, in this case, if the second light-emitting unit 31 is powered on to emit light, the emitted light of the second light-emitting unit 31 can be reflected on the electrochromic film 50 to emit, without being incident on the background image 22, so that in the case where the user uses the second light-emitting unit 31 to illuminate, the background image 22 is not visible, and the common main lighting mode is achieved.

In the embodiments of the present disclosure, the lighting device 100 may have four working modes under control of the controller 40, and the four working modes include an auxiliary on-off mode, an auxiliary constant light-on mode, a main lighting mode, and a light-out mode. Specifically, the auxiliary on-off mode refers to a working mode in which the second light-emitting unit 31 is always off in the case where the power is turned off and the first light-emitting unit 21 is switched between light-on and light-out according to a human activity signal; the auxiliary constant light-on mode refers to a working mode in which the second light-emitting unit 31 is always off in the case where the power is turned off and the first light-emitting unit 21 is always on in the case where the power is turned on; the main lighting mode refers to a working mode in which the second light-emitting unit 31 is always on in the case where the power is turned on and the first light-emitting unit 21 is always off in the case where the power is turned off; and the light-out mode refers to a working mode in which both the first light-emitting unit 21 and the second light-emitting unit 31 are always off in the case where the power is turned off. In practical applications, the lighting device 100 may only have any two or three of the above-mentioned four working modes, and the switching of the working mode is controlled by the controller 40.

In addition to the above-mentioned four working modes, the lighting device 100 may have other more working modes, for example, a working mode in which the first light-emitting unit 21 is always off in the case where the power is turned off and the second light-emitting unit 31 is switched between light-on and light-off, and the relevant description will not be repeated herein.

In the embodiments of the present disclosure, the always on or always off of the light-emitting unit means that the state of the light-emitting unit in the working mode is not changed, until the lighting device 100 switches the working mode, and the mode of the light-emitting unit is changed. The light-emitting unit being switched between on and off means that the light-emitting unit can emit light or can be turned off in the working mode.

The auxiliary constant light-on mode and the auxiliary on-off mode are collectively referred to as the auxiliary lighting mode. The emitted light in the auxiliary lighting mode is changeable along with the background image 22, because a pattern may be set on the background image 22, the emitted light in the auxiliary lighting mode has a decorative effect. In the case where the background image 22 has a single color, in this case, the spectrum (such as luminous flux, color temperature, or color, etc.) of the light emitted by the lighting device 100 may be changed as the change of the background image 22 In the case where the background image 22 has a pattern of lines and a plurality of colors, the pattern on the background image 22 can be reflected on the lighting device 100.

The lighting device 100 further includes a detector 60 which is powered on and enabled in the auxiliary on-off mode, the detector 60 is configured to detect the human activity signal in a lighting region, and the controller 40 controls the first light-emitting unit 21 to be turned on or turned off according to the human activity signal. The lighting region refers to a target region where the lighting device mainly illuminates.

The detector 60 is mounted on the housing 10, the detector 60 is located at the periphery of the light exit 111 on the front housing 11, and the detector 60 may be on a front surface or a side surface of the front housing 11. The front surface refers to a surface where the light exit 111 is located, and the side surface refers to a surface that is adjacent and perpendicular to the front surface. The detector 60 may be various sensors for detecting whether the human body moves, for example, the various sensors may be infrared sensors and ultrasonic sensors.

In the case where the working mode of the lighting device is switched to the auxiliary on-off mode, the controller 40 activates the detection mode of the detector 60 to control the power on and power off of the first light-emitting unit 21. Specifically, the controller 40 is connected with the detector 60, and controls the power on and power off of the first light-emitting unit 21 according to the human activity signal detected by the detector 60. The human activity signal includes a first signal indicating that the human body is active and a second signal indicating that the human body is inactive, in the case where the controller 40 receives the first signal indicating that the human body is active, the controller 40 controls the first light-emitting unit 21 to be powered on. In the case where the controller 40 receives the second signal indicating that the human body is inactive, the controller 40 controls the first light-emitting unit 21 to be powered off.

As a variation, the human activity signal may be specific actions of the human body, the detector 60 is capable of recognizing the specific actions of the human body, and the controller 40 generates a corresponding signal according to the specific actions recognized by the detector 60. For example, in the case where the human body swings hands from left to right in front of the detector 60, the controller 40 receives the first signal and controls the first light-emitting unit 21 to be powered on. In the case where the human body swings hands from right to left in front of the detector 60, the controller 40 receives the second signal and controls the first light-emitting unit 21 to be powered off.

The power on and power off of the electrochromic film 50 mentioned above may not be related to light-emitting or power-off of the first light-emitting unit 21, but is directly related to the detection result of the detector 60. In the case where the detector 60 detects the human activity, the controller 40 controls the electrochromic film 50 to be powered on; and in the case where the detector 60 does not detect the human activity, the controller 40 controls the electrochromic film 50 to be powered off. The control method makes the display of the pattern not be restricted by the lighting mode, even in the main lighting mode, the effect that the background image 22 is displayed in the case where a person walks close to the detector 60 and the ordinary lighting appears in the case where the person walks away from the detector 60 can be achieved.

The detector 60 acquires the human activity signal periodically to control the power on and power off of the first light-emitting unit 21 in time.

If the detector 60 is not provided in the lighting device, the working modes of the lighting device may not include the above-mentioned auxiliary on-off mode, or the auxiliary on-off mode is directly controlled by the controller according to a preset program.

The first light-emitting unit 21 and the second light-emitting unit 31 are disposed on the same light source substrate 70, the light source substrate 70 is parallel to the side surface 321 of the light guide plate 32, and the first light-emitting unit 21 is disposed at the periphery region of the background image 22. Specifically, there is a space between the electrochromic film 50 and the background image 22, the light from the plurality of first light-emitting units 21 is emitted from the periphery region of the background image 22 and is incident on the surface of the background image 22 through the space, so that the light emitted from the first light-emitting units 21 is more and uniformly projected onto the background image 22, to improve the light utilization efficiency of the first light-emitting unit 21. In other words, the optical axis of the first light-emitting unit 21 is located at middle of the space between the electrochromic film 50 and the background image 22.

The first light source 20 further includes a light distribution element 23 covering the first light-emitting unit 21, and the light distribution element 23 is configured to guide the light emitted from the first light-emitting unit 21 to be uniformly projected onto the background image 22, so that the background image 22 is uniformly and clearly illuminated. The light distribution element 23 is a polarizing optical element, so that light is more deflected towards the surface of the background image 22. The light distribution element 23 is in a shape of a long strip, and the light distribution element 23 is connected with the light source substrate 70 in a shape of a strip, and the light distribution element 23 is made of a light-transmitting material, for example, a transparent PC (polycarbonate), a transparent PMMA (polymethyl methacrylate), or a transparent glass, and may also be made of a matte PC, a matte PMMA, or a matte glass.

The housing 10 of the lighting device in the embodiment of the present disclosure includes a front housing 11 and a rear cover 12, the front housing 11 is provided with the light exit 111 and the accommodating cavity 112, and the accommodating cavity 112 accommodates both the first light source 20 and the second light source 30. Specifically, the front housing 11 has the light exit 111 and an opening 113 opposite to the light exit 111, the accommodating cavity 112 is disposed between the light exit 111 and the opening 113, and the rear cover 12 is docked with the front housing 11, and the rear cover 12 cover the opening 113. The size of the opening 113 is larger than the size of the light exit 111, in the case of assembling the lighting device, the light guide plate 32 and the light source substrate 70, on which both the first light-emitting unit 21 and the second light-emitting unit 31 are mounted, are mounted into the accommodating cavity 112 of the front housing 11 through the opening 113. The background image 22 of the first light source 20 is disposed on the rear cover 12.

The front housing 11 and the rear cover 12 are detachably connected with each other, for example, a snap-fitting connection or a threaded connection. The background image 22 is detachably disposed on the rear cover 12, for example, a snap-fitting connection, a threaded connection, or a bonding connection. In the case where the user needs to replace the background image 22, the background image 22 can be replaced directly by opening the rear cover 12 without transferring the remaining parts, so that the background image can be changed quickly and easily.

In the embodiments of the present disclosure, the connection includes a mechanical connection and an electrical connection, the mechanical connection includes a direct connection in which two components are in direct contact with each other and an indirect connection in which the two components are not in direct contact with each other, and the electrical connection includes a wire connection and a wireless connection. Stacking refers to a structure in which two components have a stacked up-down relationship, and includes a direct stacking in which the two components are in direct contact with each other and an indirect stacking in which the two components are not in direct contact with each other.

In the embodiments of the present disclosure, the on and off of the first light-emitting unit 21 and the second light-emitting unit 31 can be achieved by the turning on or the turning off of the power, the current value passing through the first light-emitting unit 21 and the current value passing through the second light-emitting unit 31 can also be adjusted based on the pulse width modulation principle, so that the control of the on and off of the first light-emitting unit 21 and the second light-emitting unit 31 is achieved.

The working process of the lighting device according to the embodiment of the present disclosure is as follows.

The lighting device 100 receives a preset instruction to drive either the first light-emitting unit 21 or the second light-emitting unit 31 to emit light, the controller 40 controls the power on and power off of the electrochromic film 50 according to the preset instruction, so that the electrochromic film 50 is in a transmission state or in a non-transmission state, and therefore, the first light source 20 and the second light source 30 are mutually transmissive or non-transmissive. Specifically, after receiving the preset instruction to drive the first light-emitting unit 21 to emit light, the controller 40 drives the electrochromic film 50 to be powered on to be in the transmission state, the light emitted from the first light-emitting unit 21 passes through the light guide plate 32 to emit out; and after the controller 40 receives the preset instruction to drive the second light-emitting unit 31 to emit light, the controller 40 drives the electrochromic film 50 to be powered off to be in the non-transmission state.

In the auxiliary on-off mode, the controller 40 receives the human activity signal from the detector 60, and controls the first light-emitting unit 21 to be powered on or powered off according to the human activity signal. The detector 60 acquires human activity signals periodically, specifically, if the signal indicating that the human body moves is obtained and the first light-emitting unit 21 is powered on at this time, the first light-emitting unit 21 continues to be powered on within a preset time, and the detector 60 acquires the human activity signal again after the preset time ends; if the signal indicating that the human body moves is obtained and the first light-emitting unit 21 is powered off at this time, the controller controls the first light-emitting unit 21 to be powered on within a preset time, and the detector 60 acquires the human activity signal again after the preset time ends; if the signal indicating that the human body does not move is obtained and the first light-emitting unit 21 is powered on at this time, the detector 60 acquires the human activity signal again after that the controller 40 controls the first light-emitting unit 21 to be powered off and to be kept for a preset time; and if a signal indicating that the human body does not move is obtained and the first light-emitting unit 21 is powered off at this time, the first light-emitting unit 21 is kept to be powered off for a preset time, and the detector 60 acquires the human activity signal again after the preset time ends. The preset time may be from seconds to minutes, such as in a range from 3 seconds to 3 minutes.

In the above lighting device, the second light source includes a light guide plate stacked with the background image and a second light-emitting unit disposed on a side surface of the light guide plate; and light emitted from the second light-emitting unit is diffused and emitted through the light guide plate.

In the above lighting device, an optical axis of the second light-emitting unit is collinear with a center line of the light guide plate.

In the above lighting device, transparent diffusion particles are distributed in the light guide plate; and there are no printing spots or laser spots on a surface of the light guide plate.

In the above lighting device, the transparent diffusion particles are organic silicon diffusion agents.

In the above lighting device, the lighting device further includes an electrochromic film disposed between the light guide plate and the first light source or between the light guide plate and the background image; in a case where the first light-emitting unit emits light, the controller controls the electrochromic film to be powered on; and in a case where the first light-emitting unit is powered off, the controller controls the electrochromic film to be powered off.

In the above lighting device, a working mode of the lighting device at least includes an auxiliary constant light-on mode in which the first light-emitting unit is always on, a main lighting mode in which the second light-emitting unit is always on, and a light-out mode in which both the first light-emitting unit and the second light-emitting unit are always off.

In the above lighting device, a working mode of the lighting device includes an auxiliary on-off mode in which the second light-emitting unit is always off and the first light-emitting unit is switched between on and off.

In the above lighting device, the lighting device includes a detector enabled in the auxiliary on-off mode, and the detector is used for detecting a human activity signal in a lighting region; and the controller is connected with the detector, and the controller controls the first light-emitting unit to be powered on or powered off according to the human activity signal.

In the above lighting device, the lighting device includes an electrochromic film disposed between the light guide plate and the first light source, and a detector for detecting a human activity signal in a lighting region; in a case where the detector detects human activity, the controller controls the electrochromic film to be powered on; and in a case where the detector does not detect the human activity, the controller controls the electrochromic film to be powered off.

In the above lighting device, the detector is configured to acquire the human activity signal periodically.

In the above lighting device, the first light-emitting unit is disposed at a periphery region of the background image; and the first light-emitting unit and the second light-emitting unit are disposed on a same substrate.

In the above lighting device, the first light source further includes a light distribution element covering the first light-emitting unit; and the light distribution element is configured to guide the light emitted from the first light-emitting unit to be uniformly projected onto the background image.

In the above lighting device, the housing includes a front housing provided with the light exit and a rear cover docked with the front housing; and the background image is disposed on the rear cover.

In the above lighting device, the background image is detachably disposed on the rear cover.

Compared with the prior art, the lighting device provided by the present disclosure includes the first light source, the second light source, and the controller. The first light source includes the first light-emitting unit and the background image, the first light source can be used to achieve an auxiliary lighting mode, and in the case where the first light source emits light, the background image is visible from the light exit, so that the auxiliary lighting mode with a decorative effect is achieved. The second light source is used to achieve a main lighting mode. The controller can control at most one selected from a group consisting of the first light source and the second light source to emit light, so that the main lighting mode or the auxiliary lighting mode is achieved to meet the diverse requirements of users.

The specific embodiments mentioned above further describe the object, technical solutions, and beneficial effects of the present disclosure. It should be understood that, the above are only specific embodiments of the present disclosure and are not intended to limit the present disclosure. Any modification, equivalent replacement, or improvement made within the spirit and principle of the present disclosure shall be included in the protection scope of the present disclosure.

What is claimed is:

1. A lighting device, comprising a housing, wherein the housing is provided with a light exit and an accommodating cavity extending inward from the light exit; the lighting device further comprises a first light source, a second light source, and a controller;

the controller is connected with both the first light source and the second light source, and the controller controls at most one selected from a group consisting of the first light source and the second light source to emit light;

both the first light source and the second light source are disposed in the accommodating cavity of the housing, the first light source is away from the light exit, and the second light source is close to the light exit;

the first light source comprises a first light-emitting unit and a background image that receives light from the first light-emitting unit and reflects the light to the light exit, and the second light source comprises a light guide plate stacked with the background image and a second light-emitting unit disposed on a side surface of the light guide plate; and light emitted from the second light-emitting unit is diffused and emitted through the light guide plate;

the lighting device comprises an electrochromic film disposed between the light guide plate and the first light source, and a detector for detecting a human activity signal in a lighting region;

in a case where the detector detects human activity, the controller controls the electrochromic film to be powered on; and in a case where the detector does not detect the human activity, the controller controls the electrochromic film to be powered off.

2. The lighting device according to claim 1, wherein an optical axis of the second light-emitting unit is collinear with a center line of the light guide plate.

3. The lighting device according to claim 1, wherein transparent diffusion particles are distributed in the light guide plate.

4. The lighting device according to claim 3, wherein the transparent diffusion particles are organic silicon diffusion agents.

5. The lighting device according to claim 1, wherein the electrochromic film is further disposed between the light guide plate and the background image, wherein in a case where the first light-emitting unit emits light, the controller controls the electrochromic film to be powered on; and in a case where the first light-emitting unit is powered off, the controller controls the electrochromic film to be powered off.

6. The lighting device according to claim 1, wherein a working mode of the lighting device at least comprises an auxiliary constant light-on mode in which the first light-emitting unit is always on, a main lighting mode in which the second light-emitting unit is always on, and a light-out mode in which both the first light-emitting unit and the second light-emitting unit are always off.

7. The lighting device according to claim 1, wherein a working mode of the lighting device comprises an auxiliary on-off mode in which the second light-emitting unit is always off and the first light-emitting unit is switched between on and off.

8. The lighting device according to claim 7, wherein the detector is enabled in the auxiliary on-off mode, and the detector is used for detecting the human activity signal in a lighting region; and the controller is connected with the detector, and the controller controls the first light-emitting unit to be powered on or powered off according to the human activity signal.

9. The lighting device according to claim 8, wherein the detector is configured to acquire the human activity signal periodically.

10. The lighting device according to claim 1, wherein the first light-emitting unit is disposed at a periphery region of the background image; and the first light-emitting unit and the second light-emitting unit are disposed on a same substrate.

11. The lighting device according to claim 1, wherein the first light source further comprises a light distribution element covering the first light-emitting unit; and the light distribution element is configured to guide the light emitted from the first light-emitting unit to be uniformly projected onto the background image.

12. The lighting device according to claim 1, wherein the housing comprises a front housing provided with the light exit and a rear cover docked with the front housing; and the background image is disposed on the rear cover.

13. The lighting device according to claim 12, wherein the background image is detachably disposed on the rear cover.

14. A light housing, comprising:

a light exit and an accommodating cavity extending inward from the light exit; and a first light source and a second light source disposed in the accommodating cavity of, the first light source is away from the light exit, and the second light source is close to the light exit, wherein the first light source comprises a first light-emitting unit and a background image that receives light from the first light-emitting unit and reflects the light to the light exit, wherein a controller is connected with both the first light source and the second light source, and the controller controls at most one selected from a group consisting of the first light source and the second light source to emit light, the second light source comprises a light guide plate stacked with the background image and a second light-emitting unit disposed on a side surface of the light guide plate; and light emitted from the second light-emitting unit is diffused and emitted through the light guide plate;

the lighting device comprises an electrochromic film disposed between the light guide plate and the first light source, and a detector for detecting a human activity signal in a lighting region;

in a case where the detector detects human activity, the controller controls the electrochromic film to be powered on; and in a case where the detector does not detect the human activity, the controller controls the electrochromic film to be powered off.

15. The light housing according to claim 14, wherein the first light-emitting unit is disposed at a periphery region of the background image; and the first light-emitting unit and the second light-emitting unit are disposed on a same substrate.

16. The light housing according to claim 14, wherein the first light source further comprises a light distribution element covering the first light-emitting unit; and the light distribution element is configured to guide the light emitted from the first light-emitting unit to be uniformly projected onto the background image.

17. The light housing according to claim 14, wherein the housing comprises a front housing provided with the light exit and a rear cover docked with the front housing; and the background image is disposed on the rear cover.

18. The light housing according to claim 17, wherein the background image is detachably disposed on the rear cover.

\* \* \* \* \*